Patented Mar. 21, 1933

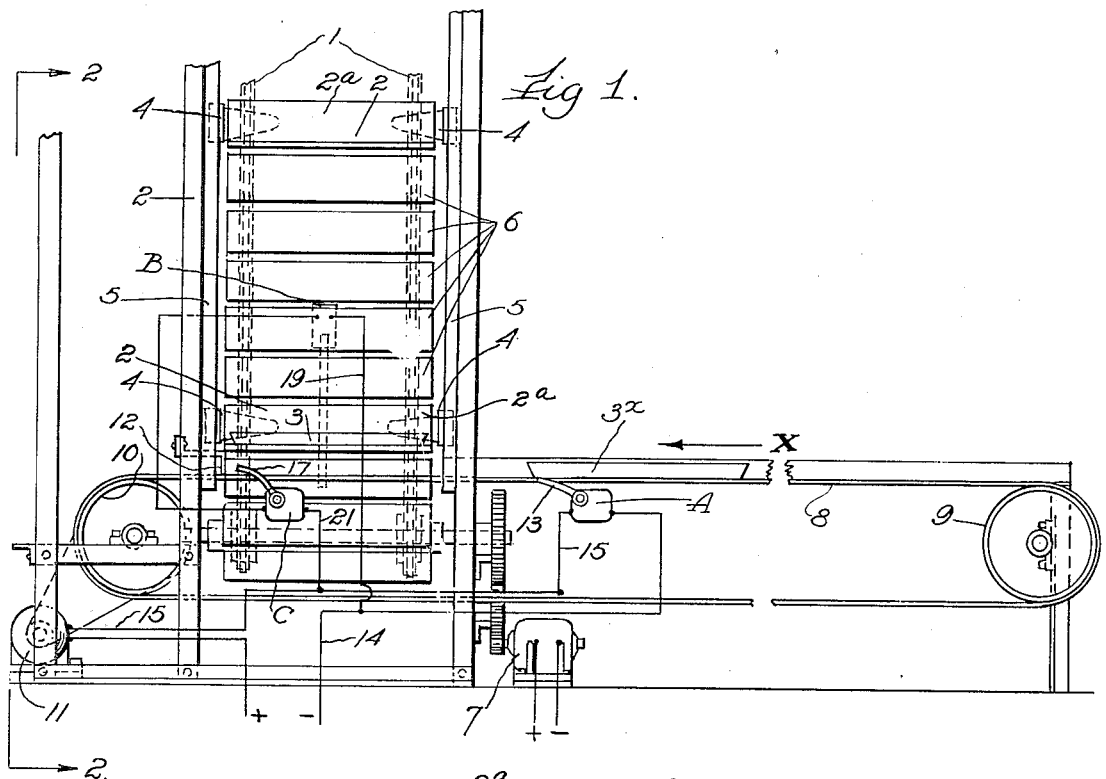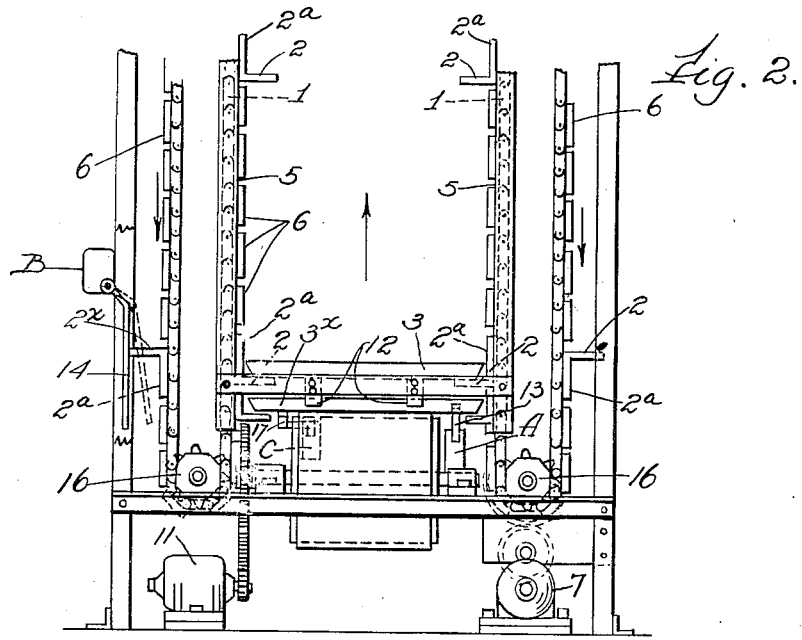

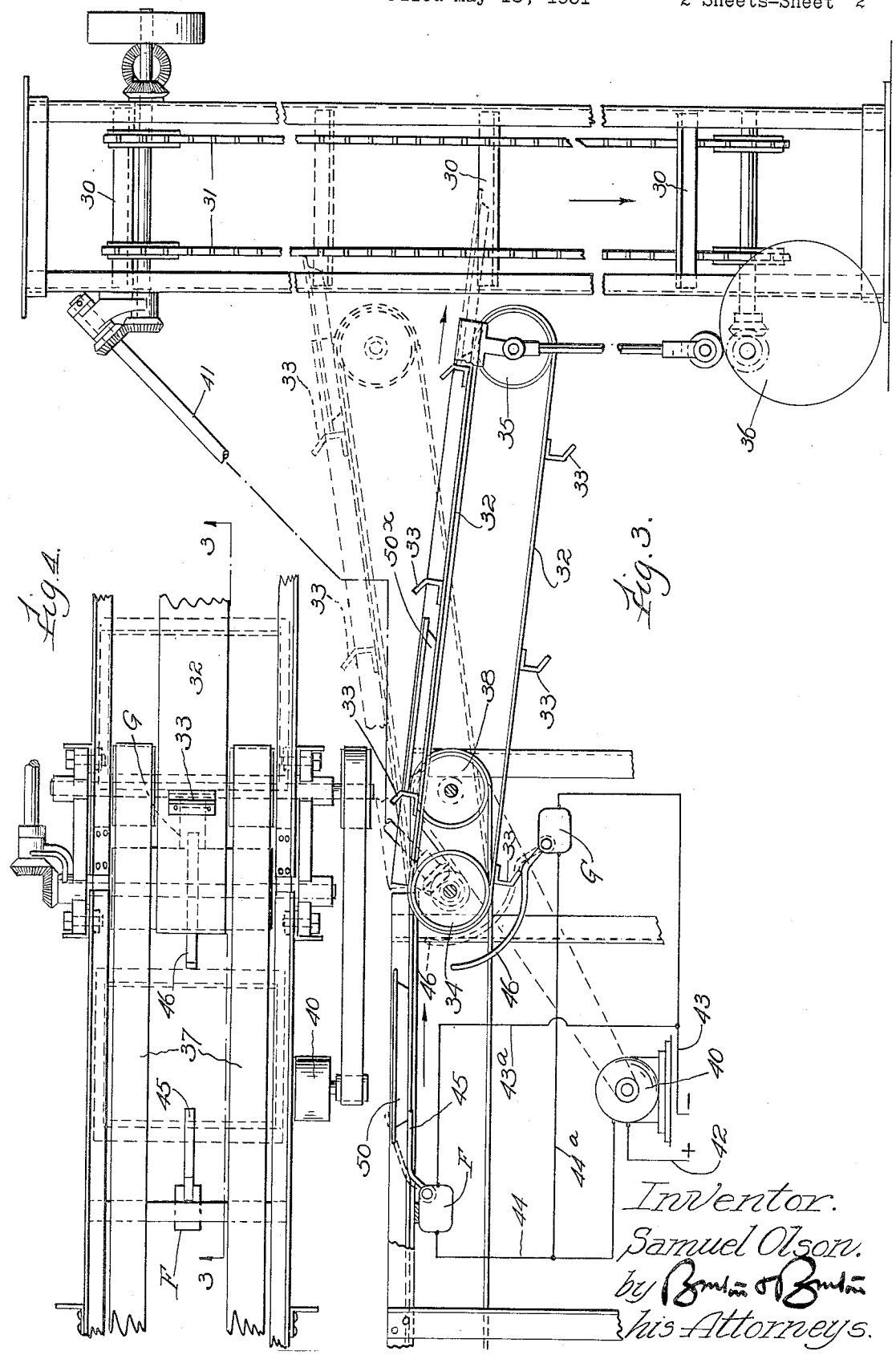

1,901,928

UNITED STATES PATENT OFFICE

SAMUEL OLSON, OF OAK PARK, ILLINOIS, ASSIGNOR TO SAMUEL OLSON & COMPANY, INC., OF CHICAGO, ILLINOIS, A CORPORATION OF ILLINOIS

AUTOMATIC SPACER

Application filed May 18, 1931. Serial No. 538,031.

This invention relates to conveying machinery, and particularly to mechanism in which a load is delivered from one conveyor to another. More specifically it is designed to control the transfer of load units from a horizontal conveyor to a vertical conveyor, and to space or time such transfer as to avoid the possibility of collision between the load units or between said units and parts of either conveying mechanism. The invention consists in the combination and arrangement of certain features and elements as herein shown and described, and as indicated by the claims.

In the drawings:

Figure 1 is a somewhat diagrammatic side elevation of a conveying mechanism which includes a vertical conveyor and a horizontal conveyor designed to feed load units to it, together with certain electrical switch mechanism embodying this invention.

Figure 2 is an end elevation of the same.

Figure 3 is a somewhat diagrammatic side elevation representing another application of this invention to a combination of conveyors.

Figure 4 is a partial plan view of the horizontal conveyor mechanism shown in Figure 3.

In the structure shown for the purpose of illustrating this invention the vertical conveyor comprises two pairs of vertically disposed endless belts or chains, 1. Each pair of chains is connected by transversely extending angular flights, 2, disposed at regular intervals in the length of the chains, and arranged so that the flights of one pair of chains will register horizontally with the flights of the other pair to cooperate in supporting a load such as a tray, indicated at 3. These flights are guided or steadied in their upward travel by any suitable means, such as the guide lugs, 4, cooperating with guide rails, 5, which extend adjacent the ends of the flights, and since for most purposes the load units consist of trays loaded with dishes or other miscellaneous articles the spaces between consecutive pairs of flights, 2, 2, are guarded by plates, 6, which may be similar in vertical extent to the vertical portions, 2ª, of each of the flight angle rails, 2. The chains, 1, are geared together to insure their operation in unison, and may be driven by any suitable means, such as the motor, 7.

The horizontal conveyor which serves to feed loads to the vertical conveyor is shown as comprising a belt, 8, and traversing pulleys, 9 and 10, and driven by a motor, 11, suitably geared or belted to the pulley, 10. The upper ply of the belt, 8, passes between the flights, 2, in their upward travel, running from the pulley, 9, toward the vertical conveyor, as indicated by the arrow, X, on Figure 1, so that a tray on the belt is carried to a position between the two pairs of vertically moving chains, 1, and is picked up by the flights, 2, 2, engaging the under surface of the tray which overhangs the belt, 8, at both sides. If the tray arrives between the chains, 1, before the flights, 2, have reached the plane of the belt, 8, the tray is arrested by any suitable stop means, such as the lugs, 12, upstanding from the frame structure of the elevator, and if the trays on the belt 8, follow each other too closely there is the possibility of a collision between the tray thus arrested and the next tray being fed through the elevator. There is also the possibility that unless the trays are very accurately timed one of them may arrive at the elevator just at the instant when a pair of flights, 2, 2, are level with the surface of the belt, 8, or slightly above it, so that the tray would collide with the ends of the flights if it were to enter the space between the chains, 1, at the same time. These difficulties are avoided by a combination of so-called "limit switches" which control the operation of the motor, 11, in accordance with my invention.

Adjacent one margin of the belt, 8, and below the path of travel of the overhanging portions of trays thereon, there is mounted the limit switch, A, whose actuating arm, 13, extends upwardly for wiping contact with the under surface of the tray. Switch, A, may be understood as of the common or usual construction, such, for example, as that illustrated in my Patent No.

1,645,619, being so arranged that depression of the arm, 13, opens the circuit. The switch is wired in series with the motor, 11, being connected with one of the feed wires, 14, and with a conductor, 15, which leads from the switch to the said motor.

However, an alternative circuit for the motor, 11, is provided by way of the switch, B, which is connected in parallel relation to the switch, A, so that if the switch, B, is closed it in effect bridges across the gap of the circuit produced by opening of the switch, A. The limit switch, B, is mounted laterally adjacent one pair of vertically disposed chains, 1, 1, of the vertical conveyor or elevator, and for convenience is disposed for contact with the flights, 2, in their descending course, as indicated in Figure 2. Since the flights, 2, are spaced along the chains, 1, at regular or uniform intervals, said flights will pass a given point in their descending travel in definite timed relation to the arrival of other flights of the series at the plane of the conveyor belt, 8. While said flights are just below this plane, and while they are passing upwardly from it through a distance to which the load on a tray might be expected to extend, it would be dangerous to permit the tray to advance into the elevator structure; therefore, during this interval the switch, B, is arranged to remain open by contact of one of the descending flights such as that marked $2^x$ on Figure 2, with the elongated arm, 14, of said switch, B. This opens the bridging circuit for the motor, 11, through the switch B, and if it happens that at the same time a tray such as that shown at $3^x$ on Figure 1 has arrived adjacent the elevator so as to depress the arm, 13, of the switch, A, then both paths or circuits from the feed wire, 14, to the motor, 11, will be opened and the power supply to the motor will be shut off, causing it to stop, and arresting the advance of the tray, $3^x$, until the flights, 2, have moved upwardly far enough to leave ample room for entry of the tray, $3^x$, between the chains, 1, 1, into position to be picked up by the next succeeding pair of flights, 2, as they round the foot wheels, 16, and move upwardly.

To guard against the possibility of a collision between a tray standing in position to be picked up by the flights, 2, and a closely following tray on the belt, 8, I provide a third limit switch, C, which may be mounted at either side of the belt, 8, with its arm, 17, extending upwardly for engagement with the under side of a tray when the latter has been moved substantially to the stops, 12, within the elevator structure. The switch, B, is connected at one side to the feed wire, 14, by a conductor, 19, and at the other side of the switch the wire, 20, leads into the switch, C. Thence a wire, 21, connects with the conductor, 15, leading to the motor, 11. Thus it will be seen that normally the switch, C, will be closed and will complete the path of the current through the switch, B, but if a tray should be positioned within the elevator structure so as to depress the switch arm, 17, and thus open the switch, C, the "bridging circuit" for the switch, A, would be thus opened, and the arrival of a tray at $3^x$ at such a time, depressing the arm, 13, and opening the switch, A, would completely break the motor circuit and stop the motor, 11. In this way the tray, $3^x$, will be held back until the tray resting on the switch arm, 17, has been picked up by the flights, 2, and moved upwardly through a safe distance.

During the initial portion of this pick-up movement the fact that the flights, 2, are still near the plane of the belt, 8, will insure that another flight of the series, such as that at $2^x$, will be in engagement with the arm, 14, of the switch, B, and will continue in such relation until the flights, 2, with their load have moved upwardly to a safe distance away from the plane of the belt, 8, as already explained in connection with the description of switch, B, and its operation.

Figures 3 and 4 represent a type of apparatus similar to that shown in United States Patent No. 1,766,142, in which a continuously traveling vertical conveyor is automatically loaded by a horizontal conveyor. The vertical conveyor includes flights, 30, carried at regular intervals by parallel chains, 31, formed to receive load-carrying trays. The horizontal conveyor includes an articulated portion or section whose belt, 32, is provided with flights, 33, which serve to positively feed the trays to the vertical conveyor, this belt being carried on the pulleys, 34 and 35, and the latter pulley being mounted for vertical movement to maintain registration of the belt, 32, with the flights, 30, during the transfer of the tray from one to the other. An eccentric cam, 36, driven in timed relation to the vertical conveyor is shown as the means for causing the vertical movement of the pulley, 35. Except for the flights, 33, on the belt, 32, the horizontal conveyor need not be provided with means for positive engagement with the trays. Leading to the belt, 32, I have shown a pair of belts, 37, extending around a pulley, 38, so as to slightly lap the belt, 32, and carry the trays to it.

To ensure proper timing of the trays as they pass from the belts, 37, to the belt, 32, I employ a pair of switches, F and G, which operate upon the same principle as the switches, A and B. The belts, 37, are driven by a motor, 40, while the belt, 32, is operated in timed relation to the chains, 31, of the vertical conveyor, a geared connection being provided, as shown, through the shaft, 41. One of the motor feed wires, 42, is shown leading direct to the motor, while the other feed wire, 43, extends into the switch, G, and a branch, 43ª, of said wire extends to the switch, F. The return wire, 44, from the switch, F, goes back to the motor, 40, and a similar connection is afforded by the branch, 44ª, from the switch, G. The switches, F and G, are thus connected in parallel with each other, so that so long as either one of them remains closed the motor, 40, will continue to run, but when the switches, F and G, are open simultaneously the motor circuit will be broken and the motor, 40, will stop. Suitable braking means may be incorporated in the motor to ensure that this motion will be promptly arrested when the current supply is cut off. The arm, 45, of the switch, F, is disposed for actuation by contact with the under side of a tray such as that shown at 50, and the arm, 46, extends for engagement with the flights, 33, of the belt, 32, as they pass from the lower ply of said belt around the pulley, 34, into position to pick up and drive trays transferred from the belts, 37, to the belt, 32. The arm, 46, is curved to extend in contact with one of the flights, 33, through a considerable portion of its travel around the pulley, 34, so that if during this period a tray, such as that shown at 50, should arrive on the belts, 37, in such a position that its continued advance would result in a collision between the tray and the flight, 33, or in engagement of the flight with the under surface of the tray, such continued movement of the tray will be prevented by reason of the fact that the tray itself depresses the arm, 45, of the switch, F, and the simultaneous opening of the circuits through switches, F and G, will stop the motor, 40. As soon as the flight, 33, has passed the end of the switch arm, 46, the latter will move to the position indicated in dotted lines in Figure 3, and the consequent closing of switch, G, will start the motor, 40, thus driving the tray, 50, forward just in time to bring it onto the belt, 32, close behind the flight, 33, which has just passed the arm, 46. The flights, 33, may be spaced apart by slightly more than the length of a tray, so that the next following flight will thus feed into position closely behind the tray and will serve to drive it in the same manner as one of the flights, 33, is shown driving the tray, 50ˣ, in Figure 3.

In this arrangement it will be seen that the provision of the electrical switches, F, and G, dispenses with the need for mecanically operated timing stops, as shown in said Patent No. 1,766,142, and provides a relatively simpler method of securing the result. In both applications of the invention herein illustrated the substitution of electric switches for the positive mechanical stops of prior devices avoids the continuous operation of the conveyor belt. This not only reduces wear on the belt but permits some economy in driving power, since it frequently takes a considerable amount of energy to continue the movement of the belt under a heavily loaded tray while the tray is held back by the mechanical stop device.

Although I have shown and described certain embodiments of the present invention, it is manifest that it is capable of further modification and rearrangement of parts without departing from the spirit and scope thereof. I do not therefore wish to be understood as limiting myself to the particular forms herein shown and described, except as indicated in the appended claims.

I claim:

1. The combination of two conveyors, one arranged to feed load units to the other, a motor connected for driving the feeding conveyor, and two circuits-in-parallel in which said motor is energized, and normally closed switches-in-parallel controlling said parallel circuits respectively, the other conveyor being driven independently of said motor and having permanently associated therewith as part thereof and disposed at regular intervals in its longitudinal extent, switch-operating means cooperating with one of said switches-in-parallel arranged for encountering and passing said switches in the movement of said other independently driven conveyor, for interrupting one of said circuits-in-parallel while said switch-operating means is passing said last mentioned switch, the other switch-in-parallel having its operable member positioned for encounter and operation by a load carried by the feeding conveyor arriving at said other switch concurrently with said passing of said last mentioned switch-operating means, whereby said concurrent arrival causes the motor to be interrupted until said switch-passing movement is completed.

2. The construction defined in claim 1, the switch-operating means of the independently driven conveyor being adapted also for propelling load units delivered to said conveyor by the feeding conveyor, the switch operated by said operating means being located for encounter by said means in the idle course of the travel of said independently driven conveyor antecedent to the arrival of said switch-operating means at position for receiving load units from the feeding conveyor.

3. The combination of two conveyors, one being arranged to feed load units to the other, and said other conveyor being equipped with means disposed at regular intervals each adapted to positively engage a load unit for propelling it, a motor connected for driving said feeding conveyor, and two switches connected in parallel with each other in the motor circuit, one being disposed for actuation by a load unit at the transfer point awaiting engagement by said load-propelling means, and the other switch being positioned to be opened by the presence of a load unit on the feeding conveyor adjacent said transfer point, the simultaneous opening of said switches serving to stop the said motor.

4. The combination of two conveyors, one being arranged to feed load units to the other, and said other conveyor being equipped with means disposed at regular intervals, each adapted to positively engage a load for propelling it, a motor connected for driving said feeding conveyor and two switches connected in series with each other in the motor circuit, one being disposed for actuation to circuit-opening position by the passage of said load-propelling means while one of said means is moving adjacent the transfer point at which loads are delivered from the feeding conveyor, and the other switch being positioned to be opened by the presence of a load unit at the transfer point awaiting engagement by said load-propelling means.

5. The combination of two conveyors, one being a horizontal conveyor arranged to feed load units to the other, and the other being an elevator equipped with flights disposed at regular intervals for travel past the lateral portions of the feeding conveyor at the transfer point for lifting a load unit therefrom and propelling it, a motor connected for driving said horizontal conveyor and two switches connected in parallel with each other in the motor circuit, one being disposed for actuation by a load unit at the transfer point awaiting engagement by said flights, and the other switch being positioned to be opened by the presence of a load unit on the horizontal conveyor adjacent said transfer, whereby the simultaneous opening of said switches serves to stop the said motor.

6. The combination of two conveyors, one being a horizontal conveyor arranged to feed load units to the other, and the other being an elevator equipped with flights disposed at regular intervals for travel past the lateral portions of the feeding conveyor at the transfer point for lifting a load unit therefrom and propelling it, a motor connected for driving said horizontal conveyor and two switches connected in parallel with each other in the motor circuit, one being disposed for actuation by a load unit at the transfer point awaiting engagement by said flights, and the other switch being positioned to be opened by the presence of a load unit on the horizontal conveyor adjacent said transfer, and a third switch connected in series with the first mentioned switch and disposed for operation by the passage of said flights for temporarily opening the motor circuit while one of said flights is moving adjacent the transfer point, whereby the horizontal conveyor will be stopped if a load unit thereon arrives adjacent the transfer point either during the passage of the elevator flights past said point or while another load stands there awaiting transfer.

SAMUEL OLSON.